United States Patent
Nakamura

(10) Patent No.: US 10,101,568 B2
(45) Date of Patent: Oct. 16, 2018

(54) ZOOM LENS, OPTICAL DEVICE, AND METHOD FOR MANUFACTURING THE ZOOM LENS

(71) Applicant: Nikon Corporation, Minato-ku, Tokyo (JP)

(72) Inventor: Keiichi Nakamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/906,220

(22) PCT Filed: Jun. 26, 2014

(86) PCT No.: PCT/JP2014/003413
§ 371 (c)(1),
(2) Date: Jan. 19, 2016

(87) PCT Pub. No.: WO2015/008437
PCT Pub. Date: Jan. 22, 2015

(65) Prior Publication Data
US 2016/0161724 A1    Jun. 9, 2016

(30) Foreign Application Priority Data
Jul. 19, 2013 (JP) .................................. 2013-150932

(51) Int. Cl.
*G02B 15/16* (2006.01)
*G02B 15/173* (2006.01)
(Continued)

(52) U.S. Cl.
CPC ........... *G02B 15/16* (2013.01); *G02B 13/009* (2013.01); *G02B 15/173* (2013.01); *G02B 27/0025* (2013.01); *G02B 27/646* (2013.01)

(58) Field of Classification Search
CPC .. G02B 15/16; G02B 27/0025; G02B 13/009; G02B 15/173; G02B 27/646; H04N 2201/0084
See application file for complete search history.

(56) References Cited

U.S. PATENT DOCUMENTS 8,379,319 B2 * 2/2013 Nakamura ........... G02B 15/173
359/687
2006/0082899 A1   4/2006 Kogo
(Continued)

FOREIGN PATENT DOCUMENTS

JP    2006-113387 A    4/2006
JP    2008-129222 A    6/2006
(Continued)

OTHER PUBLICATIONS

International Search Report from International Patent Application No. PCT/JP2014/003413, dated Sep. 22, 2014.
(Continued)

*Primary Examiner* — Alicia M Harrington
(74) *Attorney, Agent, or Firm* — Shapiro, Gabor and Rosenberger, PLLC

(57) ABSTRACT

A zoom lens includes, in order from the object side: a first lens group (G1) having positive refractive power, a second lens group (G2) having negative refractive power, a third lens group (G3) having positive refractive power, and a fourth lens group (G4) having positive refractive power. Upon zooming from the wide angle end state to the telephoto end state, the interval between each lens group changes and the fourth lens group (G4) moves to the image side after having once moved to the object side. The third lens group (G3) has, in order from the object side, a positive lens, a positive lens, and a negative lens. The zoom lens satisfies the following conditional expression: $2.50 < TLt/(fw*ft)^{1/2} < 3.30$, where TLt is the total length of the zoom lens in the
(Continued)

(EXAMPLE 1)

telephoto state, fw is the focal distance of the total zoom lens system in the wide angle state, and ft is the focal distance of the total zoom lens system in the telephoto state.

8 Claims, 9 Drawing Sheets

(51) Int. Cl.
  *G02B 13/00* (2006.01)
  *G02B 27/00* (2006.01)
  *G02B 27/64* (2006.01)

(56) References Cited

U.S. PATENT DOCUMENTS

| | | | |
|---|---|---|---|
| 2008/0204892 A1 | 8/2008 | Satori et al. | |
| 2008/0259465 A1 | 10/2008 | Nishimura | |
| 2009/0103186 A1 | 4/2009 | Hankawa | |
| 2010/0321545 A1 | 12/2010 | Hankawa | |
| 2010/0321546 A1 | 12/2010 | Hankawa | |

FOREIGN PATENT DOCUMENTS

| | | |
|---|---|---|
| JP | 2008-209773 A | 9/2008 |
| JP | 2009-98449 A | 5/2009 |
| JP | 2011-145674 A | 7/2011 |

OTHER PUBLICATIONS

Office Action dated Mar. 27, 2017, in Chinese Patent Application No. 201480041004.2.
English translation of International Preliminary Report on Patentability from International Patent Application No. PCT/JP2014/003413, dated Jan. 28, 2016.
Office Action dated Oct. 23, 2017, in Chinese Patent Application No. 201480041004.2.

\* cited by examiner

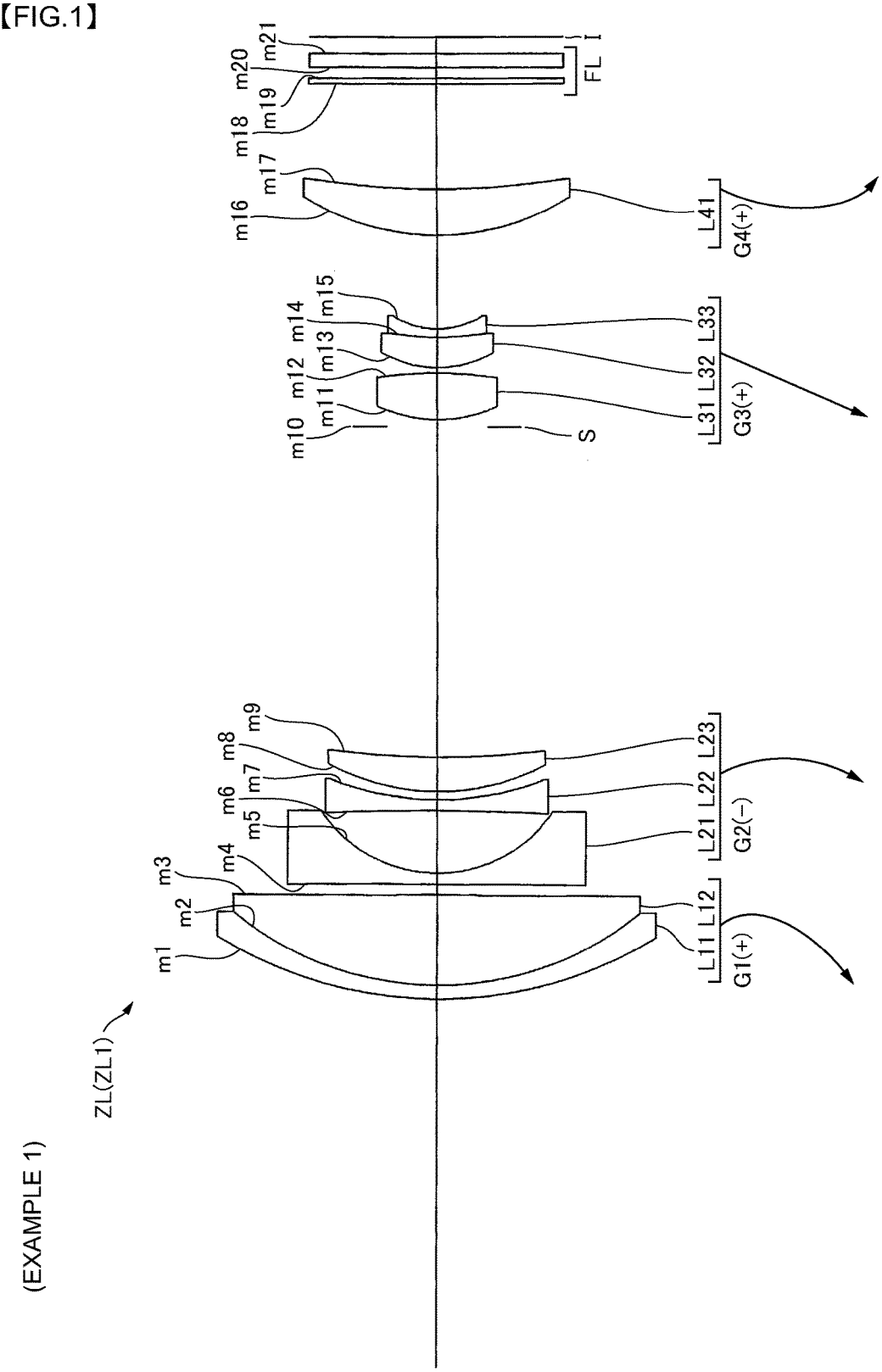

[FIG.2]
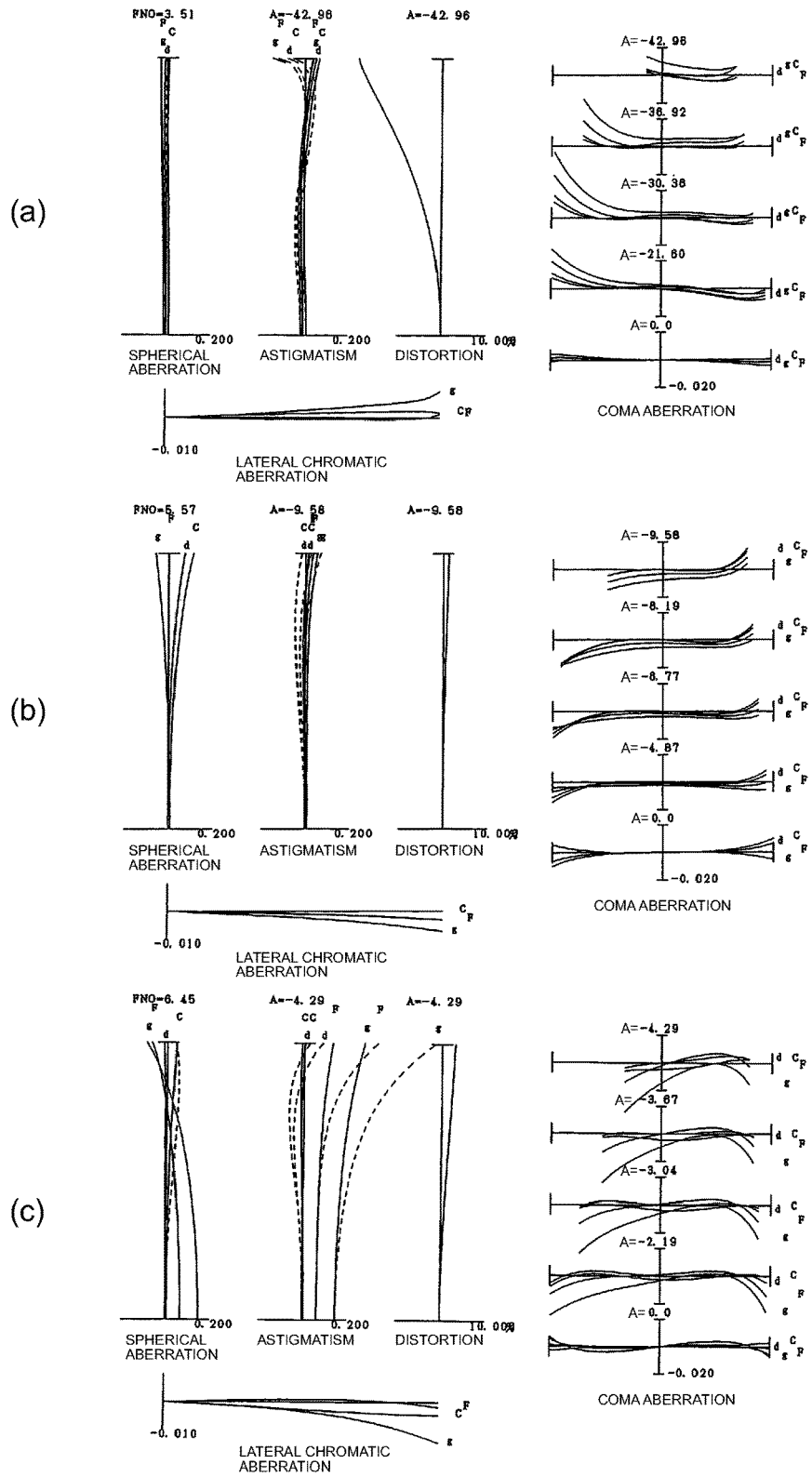

[FIG.3]
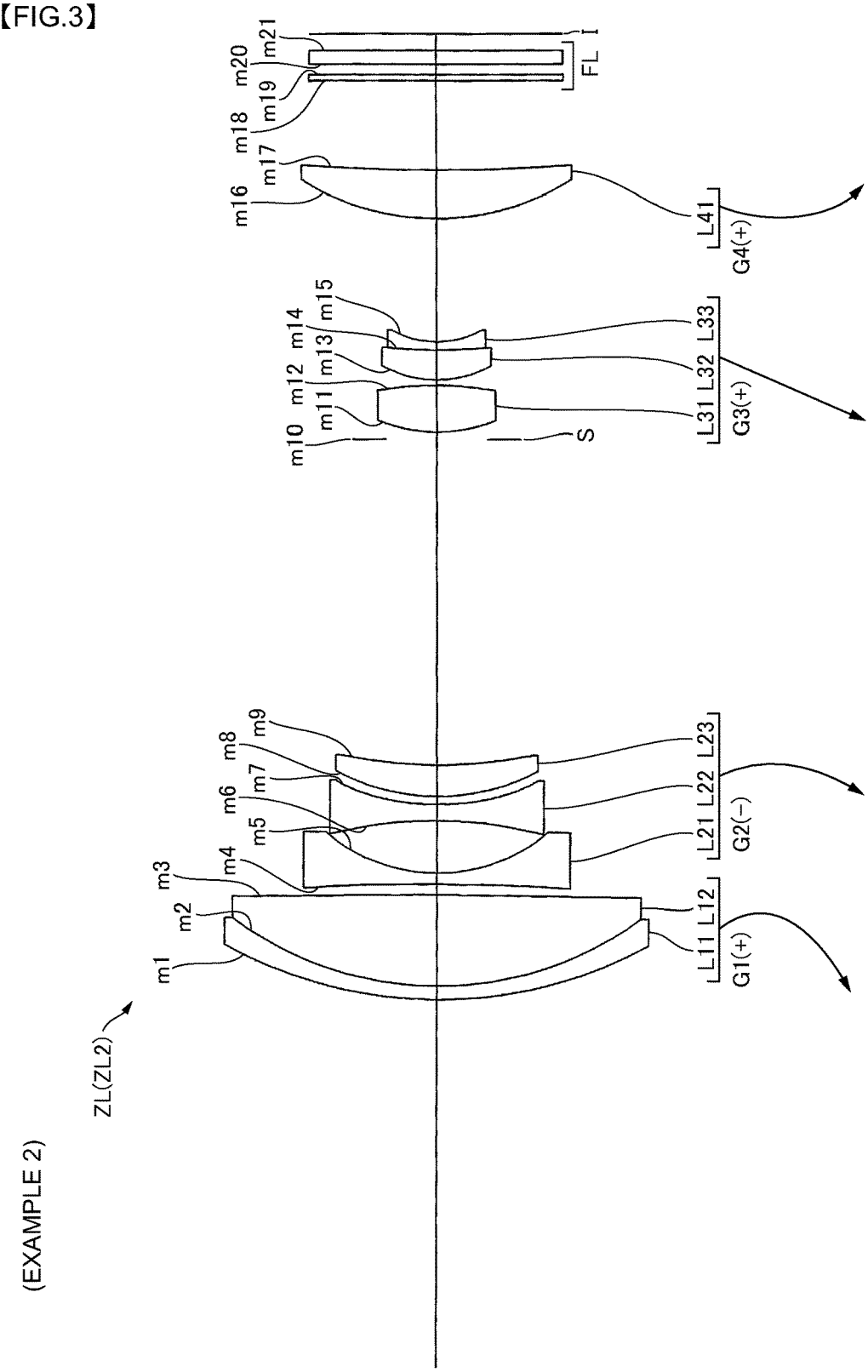

[FIG.4]
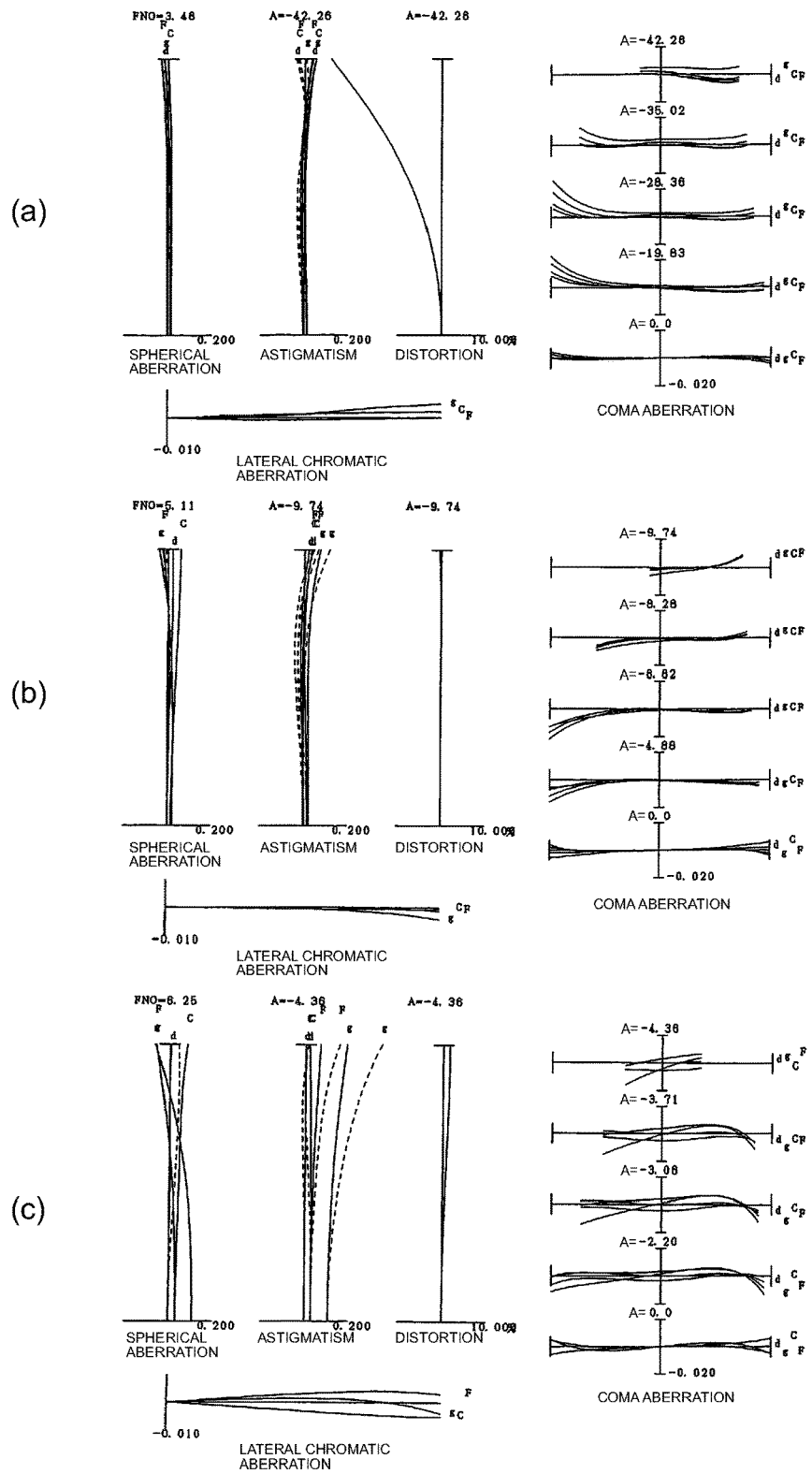

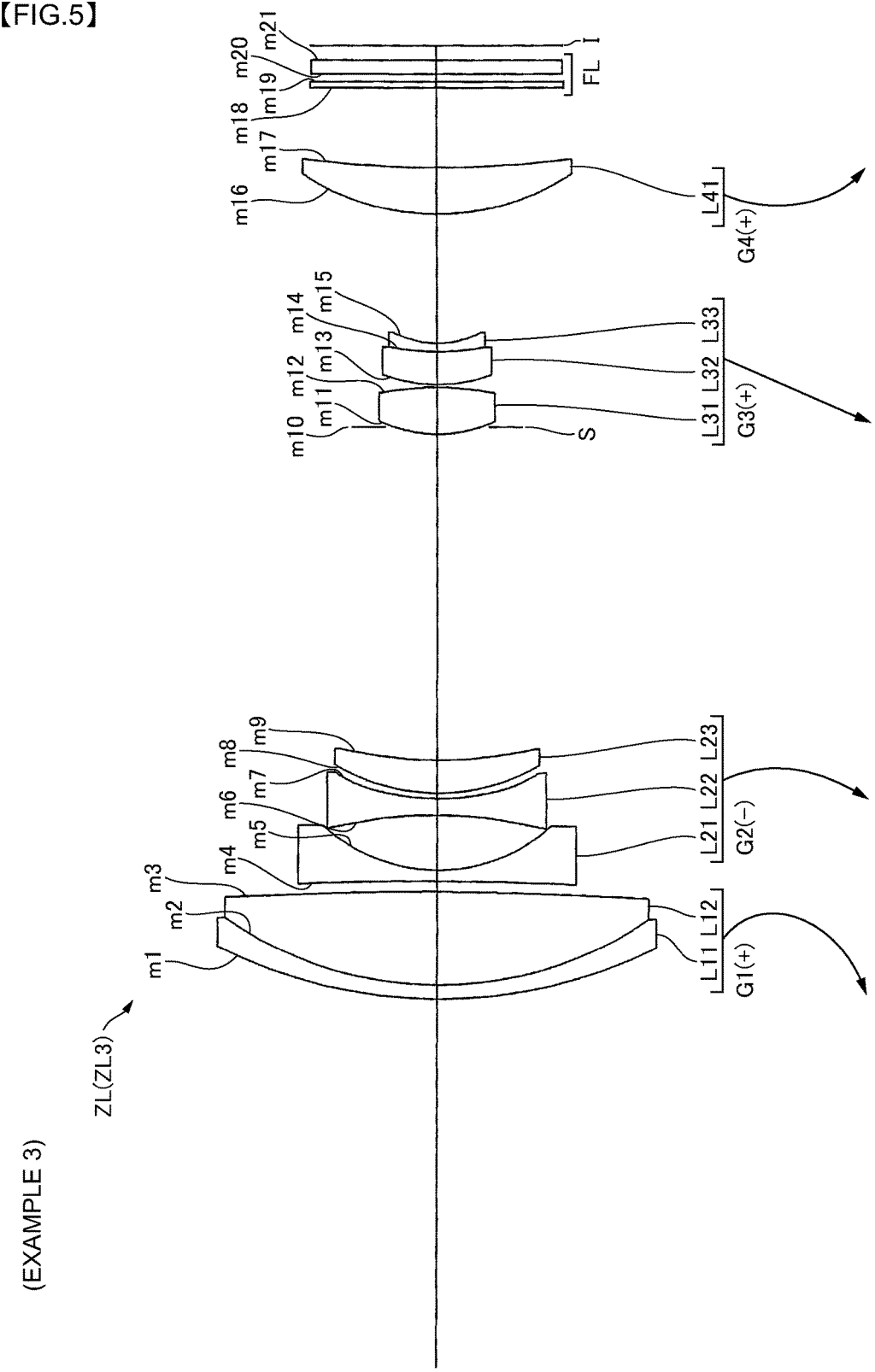

【FIG.6】
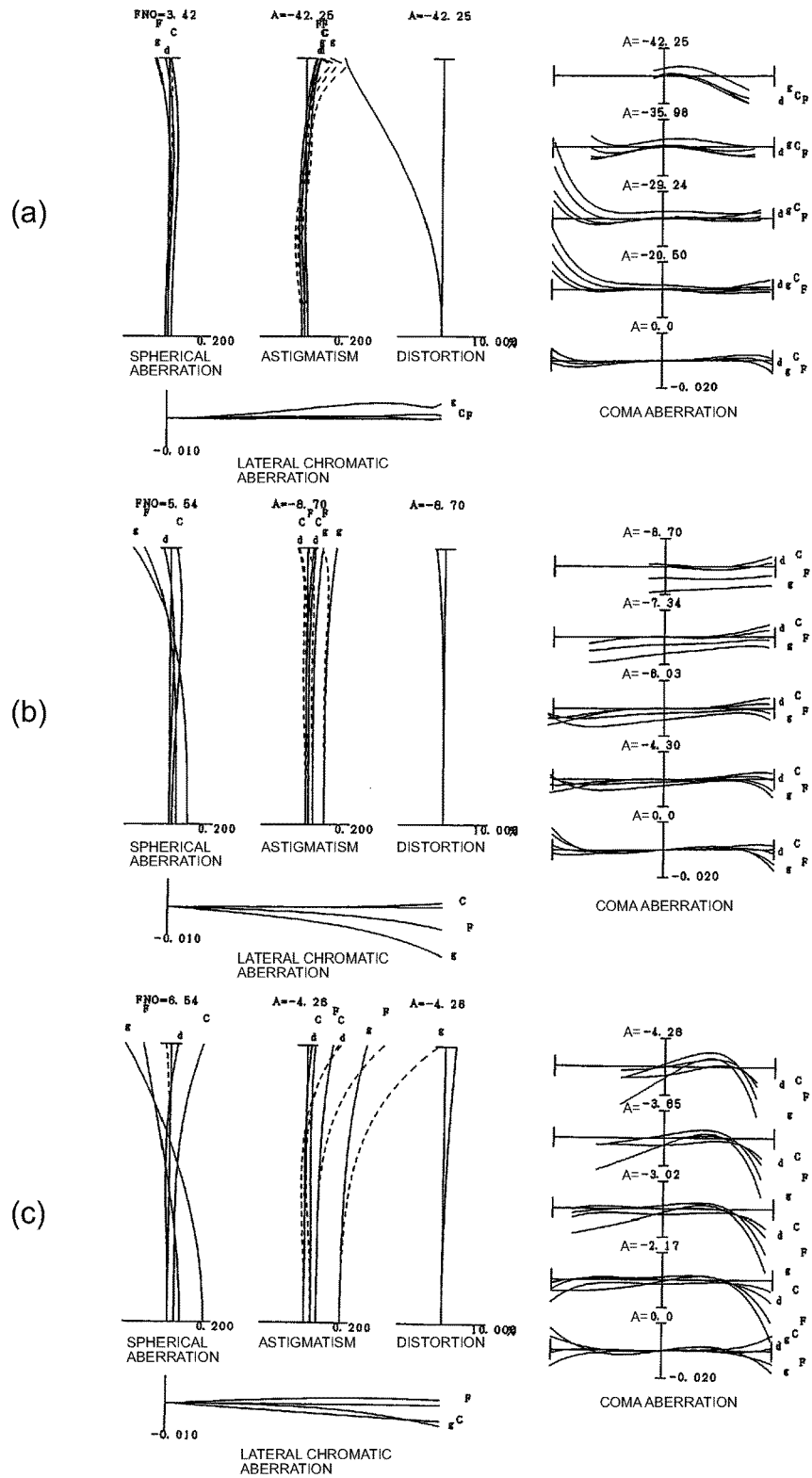

[FIG.7]
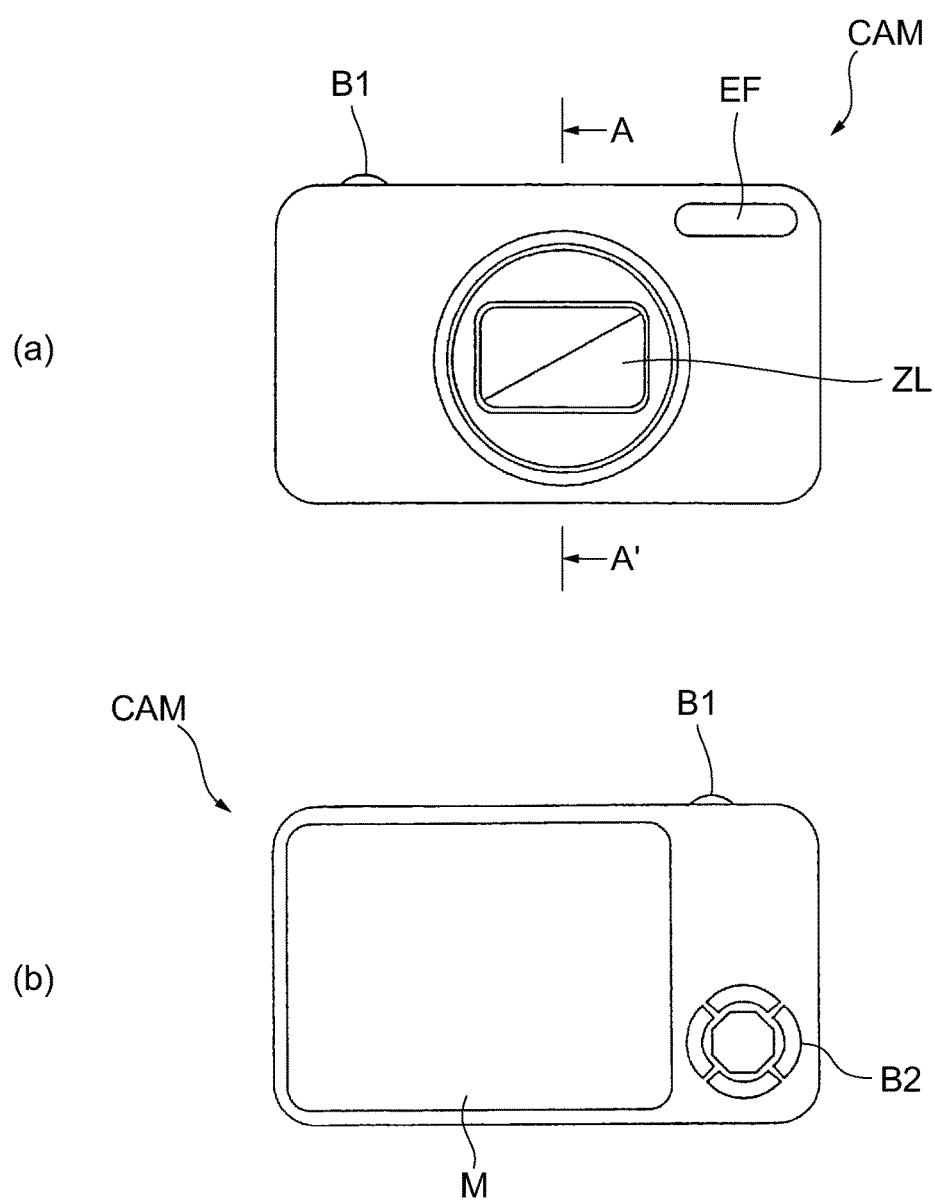

[FIG.8]
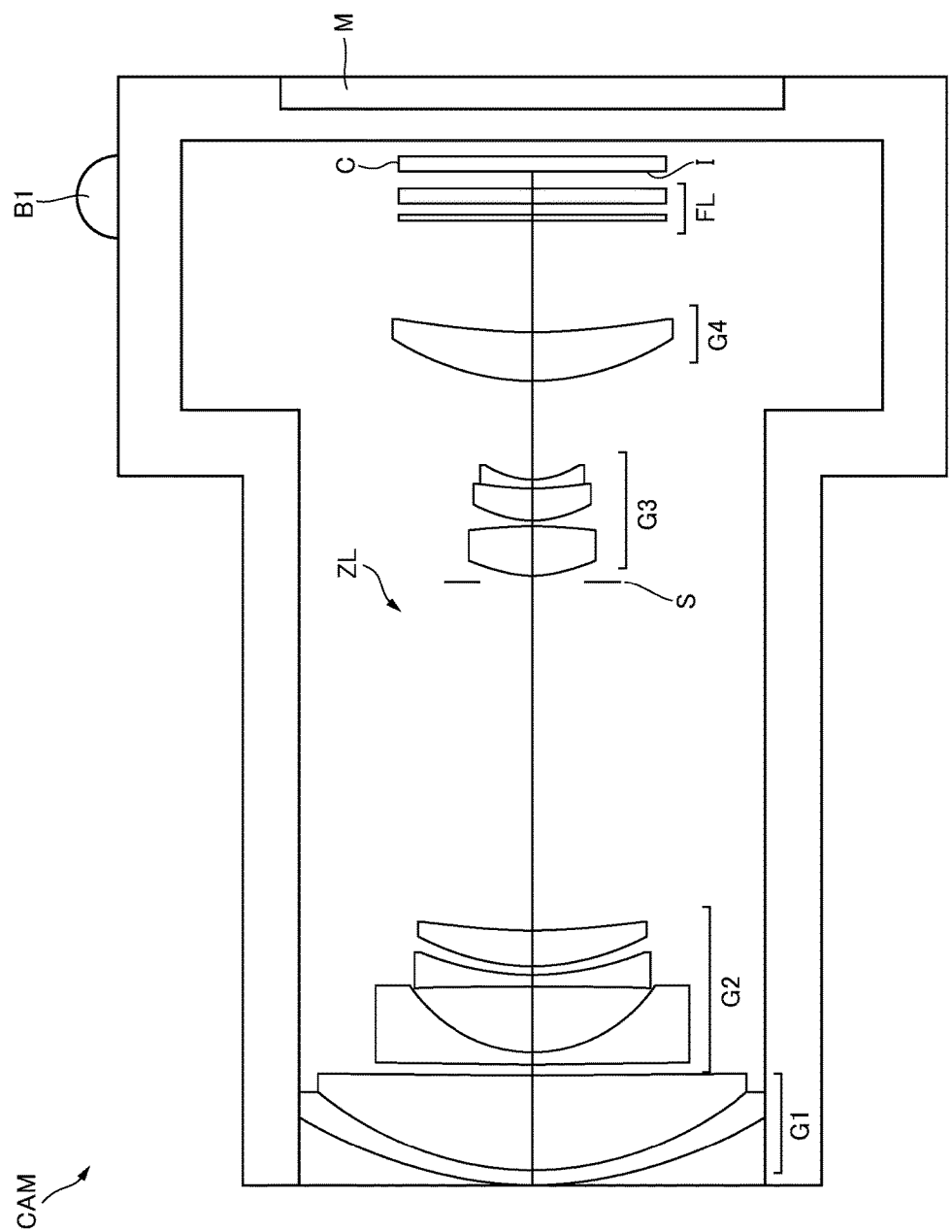

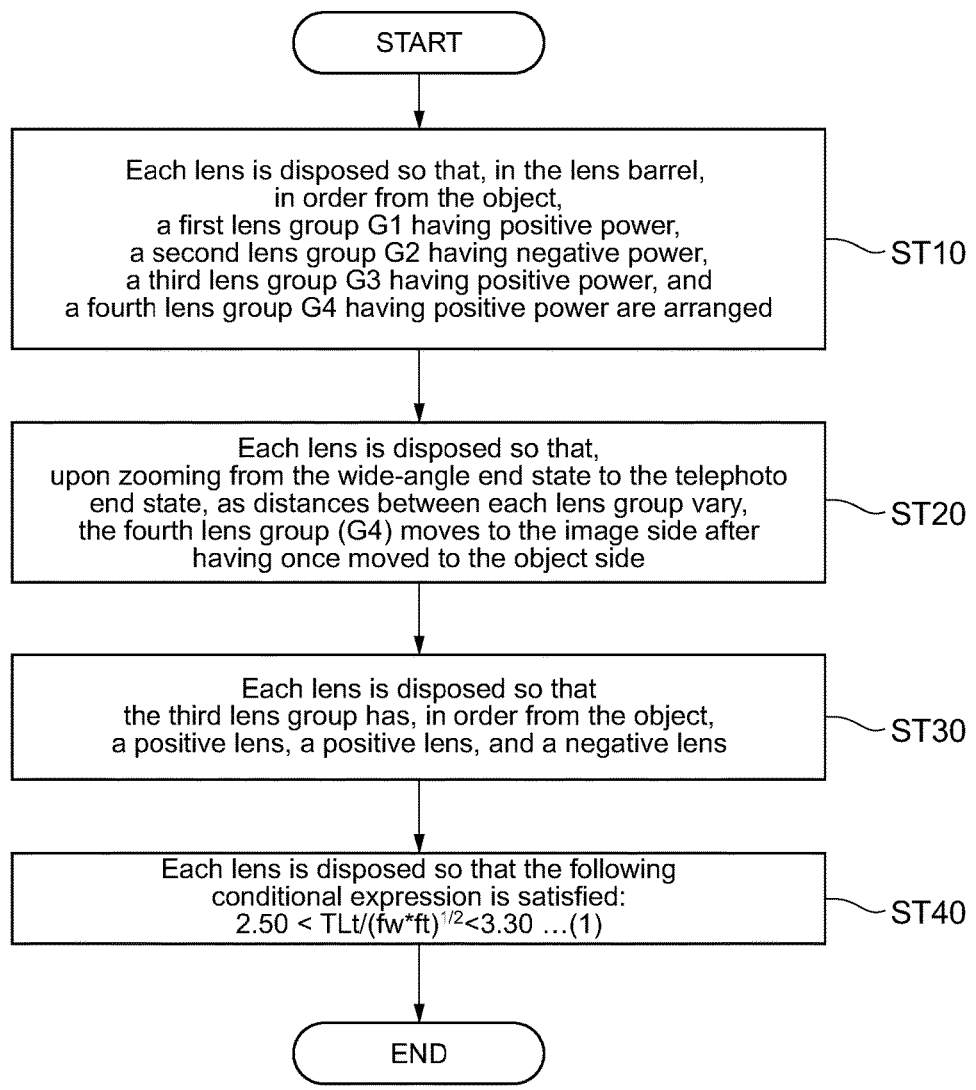
[FIG.9]

ZOOM LENS, OPTICAL DEVICE, AND METHOD FOR MANUFACTURING THE ZOOM LENS

TECHNICAL FIELD

The present invention relates to a zoom lens, an optical device, and a method for manufacturing the zoom lens.

TECHNICAL BACKGROUND

In recent years, for imaging optical systems such as video cameras and digital still cameras, demands for high zoom ratio, high performance over an total zoom range, and compactness have become strong. As a zoom lens for meeting these demands, a zoom lens comprising, arranged in order from an object along an optical axis, a first lens group having positive refractive power, a second lens group having negative refractive power, a third lens group having positive refractive power, and a fourth lens group having positive refractive power, that varies power by moving each lens group, has been provided (for instance, refer to Patent Document 1).

PRIOR ARTS LIST

Patent Document

[Patent Document 1] Japanese Laid-Open Patent Publication No. 2011-145674(A)

SUMMARY OF THE INVENTION

Problems to be Solved by the Invention

Zoom lenses that are more compact than conventional ones are required.

The present invention is made by taking account of such a problem, and aims at providing a compact zoom lens having excellent optical performance, an optical device, and a method for manufacturing the zoom lens.

Means to Solve the Problems

To achieve such objectives, a zoom lens according to the present invention includes, in order from the object: the first lens group having positive refractive power; the second lens group having negative refractive power; the third lens group having positive refractive power; and the fourth lens group having positive refractive power. Upon zooming from a wide-angle end state to a telephoto end state, distances between respective lens groups are changed and the fourth lens group moves to the image side after having once moved to the object side. The third lens group includes, in order from the object: a positive lens; a positive lens; and a negative lens, and satisfies the following conditional expression:

$$2.50 < TLt/(fw*ft)^{1/2} < 3.30,$$

where

TLt represents a total length of the zoom lens in the telephoto end state, fw represents a focal length of a total system of the zoom lens in the wide-angle end state, and ft represents a focal length of a total system of the zoom lens in the telephoto end state.

In the zoom lens according to the present invention, the second lens group includes, in order from the object: a first negative lens; a second negative lens; and a positive lens, and preferably satisfies the following conditional expression:

$$0.50 < -f2b/(fw*ft)^{1/2} < 0.90,$$

where f2b represents a focal length of the second negative lens of the second lens group.

The zoom lens according to the present invention preferably satisfies the following conditional expression:

$$0.40 < f1/ft < 0.80,$$

where f1 represents a focal length of the first lens group.

The zoom lens according to the present invention preferably satisfies the following conditional expression:

$$4.8 < f1/(-f2) < 5.6,$$

where f1 represents a focal length of the first lens group, and
f2 represents a focal length of the second lens group.

The zoom lens according to the present invention preferably satisfies the following conditional expression:

$$1.94 < Nd < 2.50,$$

where

Nd represents a refractive index with respect to d-line of the negative lens of the third lens group.

In the zoom lens according to the present invention, the second lens group preferably includes a negative lens at least one of the surfaces of which is an aspherical surface.

In the zoom lens according to the present invention, the fourth lens group preferably includes a positive lens and preferably satisfies the following conditional expression:

$$0.5 < (R42+R41)/(R42-R41) < 2.0,$$

where

R41 represents a paraxial radius of curvature of an object side lens surface of the positive lens of the fourth lens group, and R42 represents a paraxial radius of curvature of the image side lens surface of the positive lens of the fourth lens group.

The zoom lens according to the present invention preferably satisfies the following conditional expression:

$$0.20 < f3/f4 < 0.60,$$

where f3 represents a focal length of the third lens group, and
f4 represents a focal length of the fourth lens group.

An optical device according to the present invention is equipped with any one of the zoom lenses described above.

A method for manufacturing the zoom lens according to the present invention is a production method of the zoom lens including, in order from the object: the first lens group having positive refractive power; the second lens group having negative refractive power; the third lens group having positive refractive power; and the fourth lens group having positive refractive power. Upon zooming from the wide-angle end state to the telephoto end state, the distances between respective lens groups are changed and the fourth lens group moves to the image side after having once moved to the object side. The third lens group includes, in order from the object: a positive lens; a positive lens; and a negative lens, and each lens is disposed in a lens barrel so that the following conditional expression is satisfied:

$$2.50 < TLt/(fw*ft)^{1/2} < 3.30$$

where

TLt represents the total length of the zoom lens in the telephoto end state, fw represents the focal length of the total system of the zoom lens in the wide-angle end state, and ft represents the focal length of the total system of the zoom lens in the telephoto end state.

Advantageous Effects of The Invention

According to the present invention, a compact zoom lens having excellent optical performance, an optical device, and a method for manufacturing the zoom lens may be provided.

BRIEF DESCRIPTION OF THE DRAWINGS

FIG. 1 is a view illustrating a configuration of a zoom lens according to Example 1 and a movement locus (arrow) of each group from the wide-angle end state to the telephoto end state.

FIG. 2 is a view illustrating graphs showing various aberrations of the zoom lens according to Example 1 upon focusing on infinity, (a) in the wide-angle end state, (b) in an intermediate focal length state, and (c) in the telephoto end state.

FIG. 3 is a view illustrating a configuration of a zoom lens according to Example 2 and a movement locus (arrow) of each group from the wide-angle end state to the telephoto end state.

FIG. 4 is a view illustrating graphs showing various aberrations of the zoom lens according to Example 2 upon focusing on infinity, (a) in the wide-angle end state, (b) in the intermediate focal length state, and (c) in the telephoto end state.

FIG. 5 is a view illustrating a configuration of a zoom lens according to Example 3 and a movement locus (arrow) of each group from the wide-angle end state to the telephoto end state.

FIG. 6 is a view illustrating graphs showing various aberrations of the zoom lens according to Example 3 upon focusing on infinity, (a) in the telephoto end state, (b) in the intermediate focal length state, and (c) in the wide-angle end state.

FIG. 7 (a) is a front view of a digital still camera, and (b) is a rear view of a digital still camera.

FIG. 8 is a cross-sectional view along an arrow A-A' in FIG. 7(a).

FIG. 9 is a flowchart illustrating a method for manufacturing the zoom lens.

DESCRIPTION OF THE EMBODIMENTS

Below, embodiments will be described with reference to the drawings. The zoom lens ZL according to the present embodiment, as illustrated in FIG. 1, includes: a first lens group G1 having positive refractive power; a second lens group G2 having negative refractive power; a third lens group G3 having positive refractive power; and a fourth lens group G4 having positive refractive power. The third lens group G3 includes, in order from the object: a positive lens; a positive lens; and a negative lens. The third lens group G3 is preferably constituted only of, in order from the object, two positive lenses and one negative lens.

In the present embodiment, upon zooming from the wide-angle end state to the telephoto end state, the first lens group G1 to the fourth lens group G4 are moved so that the distances between respective lens groups change. Also, in the present embodiment, during zooming, a distance between the first lens group G1 and the second lens group G2 is increased, a distance between the second lens group G2 and the third lens group G3 is decreased, and a distance between the third lens group G3 and the fourth lens group G4 is increased. Furthermore, in the present embodiment, during zooming, the fourth lens group G4 moves to the image side after having once moved to the object side. Thus, due to the move of the fourth lens group G4, the zoom lens ZL can be downsized.

Under the above configuration, the zoom lens ZL according to the present embodiment satisfies the following conditional expression (1):

$$2.50 < TLt/(fw*ft)^{1/2} < 3.30 \qquad (1),$$

where

TLt represents the total length of the zoom lens ZL in the telephoto end state, fw represents the focal length of the zoom lens ZL in the wide-angle end state, and ft represents the focal length of the zoom lens ZL in the telephoto end state.

The conditional expression (1) specifies the total length of the zoom lens ZL (a distance on the optical axis from the front surface of the lens to the image surface) in the telephoto end state. When the upper limit value of the conditional expression (1) is exceeded, the total length of the zoom lens ZL becomes large relative to the focal length and downsizing cannot be achieved. To ease this, for instance, when power of the third lens group G3 is made to be strong to aim at downsizing, spherical aberration and chromatic aberration become worse. When the lower limit value of the conditional expression (1) is not attained, since, for making a focal length large with respect to the total length of the zoom lens ZL, power of the first lens group G1 becomes strong, spherical aberration and axial chromatic aberration become worse.

To ensure the effect of the present embodiment, the upper limit value of the conditional expression (1) is preferably set at 3.29.

To ensure the effect of the present embodiment, the lower limit value of the conditional expression (1) is preferably set at 2.80. To ensure the effect of the present embodiment further, the lower limit value of the conditional expression (1) is preferably set at 2.90.

In the zoom lens ZL according to the present embodiment, the second lens group G2 includes, in order from the object, a first negative lens, a second negative lens, and a positive lens, and preferably satisfies the following conditional expression (2). The second lens group G2 is preferably constituted, in order from the object, only of two negative lens and one positive lens.

$$0.50 < -f2b/(fw*ft)^{1/2} < 0.90 \qquad (2),$$

where f2b represents a focal length of the second negative lens of the second lens group G2.

The conditional expression (2) specifies the focal length of the second negative lens of the second lens group G2. When the upper limit value of the conditional expression (2) is exceeded, since power of the second negative lens of the second lens group becomes weak, distortion in the wide angel end state becomes worse. When the lower limit value of the conditional expression (2) is not attained, astigmatism in the wide-angle end state becomes worse. By a radius of curvature becoming small, since the distances to neighboring lenses have to be secured, the zoom lens ZL becomes large.

To ensure the effect of the present embodiment, the upper limit value of the conditional expression (2) is preferably set at 0.80. To ensure the effect of the present embodiment further, the upper limit value of the conditional expression (2) is preferably set at 0.70.

To ensure the effect of the present embodiment, the lower limit value of the conditional expression (2) is preferably set at 0.60. To ensure the effect of the present embodiment further, the lower limit value of the conditional expression (2) is preferably set at 0.65.

The zoom lens ZL according to the present embodiment preferably satisfies the following conditional expression (3):

$$0.40 < f1/ft < 0.80 \quad (3),$$

where f1 represents the focal length of the first lens group G1.

The conditional expression (3) specifies a relation between the focal length of the first lens group G1 and the focal length of the zoom lens ZL in the telephoto end state. When the upper limit value of the conditional expression (3) is exceeded, the power of first lens group G1 becomes weak, and distortion in the wide-angle end state becomes worse. The lower limit value of the conditional expression (3) is exceeded, the power of the first lens group G1 becomes strong, and spherical aberration and lateral chromatic aberration in the telephoto end state become worse.

To ensure the effect of the present embodiment, the upper limit value of the conditional expression (3) is preferably set at 0.70. To ensure the effect of the present embodiment further, the upper limit value of the conditional expression (3) is preferably set at 0.60.

To ensure the an effect of the present embodiment, the lower limit value of the conditional expression (3) is preferably set at 0.50.

The zoom lens ZL according to the present embodiment preferably satisfies the following conditional expression (4):

$$4.8 < f1/(-f2) < 5.6 \quad (4),$$

where f1 represents a focal length of the first lens group G1, and f2 represents a focal length of the second lens group G2.

The conditional expression (4) specifies a relation between the focal length of the first lens group G1 and the focal length of the second lens group G2. When the upper limit value of the conditional expression (4) is exceeded, the power of the first lens group G1 becomes weak and distortion in the wide-angle end state becomes worse. As the power of the second lens group G2 becomes strong and the zoom ratio becomes large, the total length of the zoom lens ZL becomes large. When the lower limit value of the conditional expression (4) is not attained, the power of the second lens group G2 becomes strong, and astigmatism and field curvature become worse.

To ensure the effect of the present embodiment, the upper limit value of the conditional expression (4) is preferably set at 5.4.

To ensure the effect of the present embodiment, the lower limit value of the conditional expression (4) is preferably set at 5.0.

The zoom lens ZL according to the present embodiment preferably satisfies the following conditional expression (5):

$$1.94 < Nd < 2.50 \quad (5),$$

where

Nd represents a refractive index with respect to d-line of the negative lens of the third lens group G3.

The conditional expression (5) specifies a proper refractive index of the negative lens of the third lens group G3. When the upper limit value of the conditional expression (5) is exceeded, axial chromatic aberration in the telephoto end state becomes worse. When the lower limit value of the conditional expression (5) is not attained, since a Petzval sum is increased, field curvature in the intermediate focal length state becomes worse.

To ensure the effect of the present embodiment, the upper limit value of the conditional expression (5) is preferably set at 2.20.

To ensure the effect of the present embodiment, the lower limit value of the conditional expression (5) is preferably set at 2.00.

In the zoom lens ZL according to the present embodiment, the second lens group G preferably includes a negative lens at least one surface of which is an aspherical surface. With such a configuration, distortion, off-axis astigmatism, coma aberration, and field curvature in the wide-angle end state can be excellently corrected.

In the zoom lens ZL according to the present embodiment, the fourth lens group G4 preferably includes a positive lens, and satisfies the following conditional expression (6). The fourth lens group G4, when being constituted of one lens satisfying the conditional expression (6), the configuration may be simplified, and a weight of the fourth lens group G4 that moves to the image side after having once moved to the object side during zooming may be lightened:

$$0.5 < (R42+R41)/(R42-R41) < 2.0 \quad (6),$$

where

R41 represents a paraxial radius of curvature of an object side lens surface of the positive lens of the fourth lens group G4, and R42 represents a paraxial radius of curvature of an image side lens surface of the positive lens of the fourth lens group G4.

The conditional expression (6) specifies a shape factor of the positive lens of the fourth lens group G4. When the upper limit value of the conditional expression (6) is exceeded, coma aberration from the intermediate focal length state to the telephoto end state becomes worse. When the lower limit value of the conditional expression (6) is not attained, a variation of the image surface from the intermediate focal length state to the telephoto end state becomes large.

To ensure the effect of the present embodiment, the lower limit value of the conditional expression (6) is preferably set at 1.0. To ensure the effect of the present embodiment further, the lower limit value of the conditional expression (6) is preferably set at 1.3.

The zoom lens ZL according to the present embodiment preferably satisfies the following conditional expression (7):

$$0.20 < f3/f4 < 0.60 \quad (7),$$

where f3 represents the focal length of the third lens group G3, f4 represents the focal length of the fourth lens group G4.

The conditional expression (7) specifies a relation between the focal length of the of the third lens group G3 and the focal length of the fourth lens group G4. When the upper limit value of the conditional expression (7) is exceeded, power of the fourth lens group G4 becomes strong, spherical aberration and axial chromatic aberration in a telephoto end state become worse, and a total length of the zoom lens ZL becomes large due to an increase in an amount of movement of the third lens group G3, thus downsizing cannot be achieved. When the lower limit value of the conditional expression (7) is not attained, power of the fourth lens group G4 becomes weak and field curvature and coma aberration in the wide-angle end state and coma aberration in a telephoto end state become worse.

To ensure the effect of the present embodiment, the upper limit value of the conditional expression (7) is preferably set at 0.50.

To ensure the effect of the present embodiment, the lower limit value of the conditional expression (7) is preferably set at 0.30.

With to the zoom lens ZL according to the present embodiment including the configuration described above, a compact zoom lens having excellent optical performance may be achieved.

In FIG. 7 and FIG. 8, a configuration of a digital still camera CAM (optical device), which is an optical device including the above described zoom lens ZL, is illustrated. The digital still camera CAM is so configured that, when a power button (not shown in figures), is pressed, a shutter (not shown in figures) of a photographic lens (zoom lens ZL) is opened, so that light from a subject (an object) is converged by the zoom lens ZL and imaged onto an imaging element C (for instance, CCD or CMOS) disposed at an image surface I (refer to FIG. 1). A subject image that is imaged on the imaging element C is displayed on a liquid crystal monitor M disposed behind the digital still camera CAM. A photographer, after determining a composition of a subject image while viewing the liquid crystal monitor M, images the subject image with the imaging element C by pressing down a release button B1 and records and saves it in a memory (not shown in figures).

In the camera CAM, an auxiliary light emitting part EF for emitting auxiliary light when a subject is dark and a function button B2 used for a various conditional settings of the digital still camera CAM and such are disposed. Although an example of a compact type camera formed by integrating the camera CAM and the zoom lens ZL is illustrated here, as an optical device, the present invention may be applied to a single-lens reflex camera having a body and a detachable lens barrel having the zoom lens ZL.

With the camera CAM according to the present embodiment including the above described configuration, by mounting the above described zoom lens ZL as a photographic lens, a compact camera having excellent performance while having a high zoom ratio may be achieved.

Next, with reference to FIG. 9, a method for manufacturing the above described zoom lens ZL is described. In a barrel, each lens is disposed (Step ST10) so that the first lens group G1 having positive refractive power, the second lens group G2 having negative refractive power, the third lens group G3 having positive refractive power, and the fourth lens group G4 having positive refractive power, are arranged in order from the object. Upon zooming from the wide-angle end state to the telephoto end state, distances between respective lens groups change and each lens is disposed (Step ST20) so that the fourth lens group G4 moves to the image side after having once moved to the object side. The third lens group G3 is so configured that each lens is disposed (Step ST30) so as to have the positive lens, the positive lens, and the negative lens, in order from the object. Each lens is disposed (Step ST40) so that the following conditional expression (1) is satisfied:

$$2.50 < TLt/(fw*ft)^{1/2} < 3.30 \qquad (1),$$

where

TLt represents the total length of the zoom lens ZL in a telephoto end state, fw represents the focal length of the total system of the zoom lens ZL in the wide-angle end state, and ft represents the focal length of the total system of the zoom lens ZL in the telephoto end state.

In one example of a lens arrangement according to the present embodiment, for the zoom lens ZL as illustrated in FIG. 1, in the first lens group G1 having positive refractive power, each lens is incorporated in the barrel so that a negative meniscus lens L11 with a convex surface facing the object side and a biconvex shaped positive lens L12 are sequentially arranged in order from the object. The negative meniscus lens L11 and the positive lens L12 are cemented to constitute a cemented lens. As the second lens group G2 having negative refractive power, each lens is incorporated in the barrel so that a biconcave shaped negative lens L21, a biconcave shaped negative lens L22, and a positive meniscus lens L23 having a convex surface facing the object are sequentially arranged in order from the object. As the third lens group G3 having positive refractive power, each lens is incorporated in the barrel so that a biconvex shaped positive lens L31 and a positive meniscus lens L32 having a convex surface facing the object, and a negative meniscus lens L33 with a convex surface facing the object side are arranged in order from the object. The positive lens L32 and the negative lens L33 are cemented to constitute a cemented lens. As the fourth lens group G4 having positive refractive power, a positive meniscus lens L41 having a convex surface facing the object is incorporated in the barrel. Each lens is incorporated in the barrel so that the conditional expression (1) described above is satisfied (a corresponding value of the conditional expression (1) is 3.1857).

According to the method for manufacturing the zoom lens ZL, a compact zoom lens having excellent optical performance while having a high zoom ratio may be produced.

EXAMPLES

Each Example according to the present embodiment is described with reference to the drawings. Below, Table 1 to Table 3 are illustrated. These are tables of each specification in Example 1 to Example 3.

The use of reference numbers for FIG. 1 according to Example 1 is independent from the use of reference numerals in other Examples to avoid complications of descriptions caused by increase of digit numbers of reference numbers. Therefore, even if common reference numbers are used to drawings associated with these examples, those are not necessarily of a configuration common to one another.

In each example, for calculation of aberration characteristics, C-line (wavelength 656.2730 nm), d-line (wavelength 587.5620 nm), F-line (wavelength 486.1330 nm) and g-line (wavelength 435.8350 nm) are selected.

In the [Lens specifications] of the tables, a surface number represents an order of an optical surface along a moving direction of light ray from the object, R represents a radius of curvature of each optical surface, D represents a distance to the next lens surface which is a distance on the optical axis from each optical surface to the next optical surface (or, the image surface), nd represents a refractive index with respect to d-line of a material of an optical member, and vd represents an Abbe number with respect to d-line of a material of an optical member. The object plane represents the object surface, (variable) represents a variable distance to the next lens surface, curvature "∞" represents a flat surface or an aperture, (Stop S) represents an aperture stop S, and the image plane represents the image surface I. The refractive index of air "1.000000" is omitted. When an optical surface is an aspherical surface, a symbol * is assigned to a surface number and a paraxial radius of curvature is shown in a column for a radius of curvature R.

In a table, for [Aspherical surface data], concerning an aspherical surface shown in the [Lens specifications], a shape thereof is represented by the next formula (a). X (y) represents a distance along the optical axis direction from a tangential plane at the apex of an aspherical surface to a position on the aspherical surface at a height y, and R represents a radius of curvature (paraxial radius of curvature) of a reference spherical surface, κ represents a conical coefficient, and Ai represents an i-th aspherical surface coefficient. "E-n" represents "×10$^{-n}$". For instance, 1.234E−05=1.234×10$^{-5}$.

$$X(y)=(y^2/R)/\{1+(1-\kappa 33\ y^2/R^2)^{1/2}\}+A4\times y^4+A6\times y^6+A8\times y^8+A10\times y^{10} \quad (a)$$

In the [Entire specifications] of the tables, f represents a focal length of the total lens system, FNo represents F number, ω represents a half field angle (maximum incident angle, unit:°), Y represents an image height, Bf represents a distance on the optical axis from the final surface of the lens (of the fourth lens group G4) to the paraxial image surface, Bf (air-equivalent) is a distance on the optical axis from the final surface of the lens (of the fourth lens group G4) to the paraxial image surface converted to an air equivalent distance, and TL represents the lens total length (obtained by adding BF to the length from the front surface of the lens to the final surface of the lens on the optical axis).

In the [Zooming data] of the tables, valuable distance values Di in each state of wide-angle end, intermediate focal length, and telephoto end are shown. Where, Di represents a variable distance between i-th surface and (i+1) surface.

In the [Zoom lens group data] of the tables, G represents a group number, a group first surface represents a surface number of a surface closest to the object of each group, a group focal length represents a focal length of each group, and a lens configuration length represents a distance on the optical axis from a lens surface on the most object side to a lens surface on the most image side of each group.

In the [Conditional expression] of the tables, values corresponding to the above described conditional expressions (1) to (7) are shown.

Although, below, for all specification values such as a focal length f, a radius of curvature R, a distance to the next lens surface D, and other lengths, "mm" is generally used unless otherwise specified, since a zoom lens may have an equivalent optical performance even when being proportionally enlarged or proportionally reduced, specifications are not limited to these. Also, unit is not limited to "mm", and other proper unit may be used.

Descriptions of the tables are commonly applicable to all the examples up to this paragraph, and descriptions of tables will be omitted hereinafter.

Example 1

Example 1 will be described by using FIG. 1, FIG. 2, and Table 1. A zoom lens ZL (ZL1) according to Example 1 is, as illustrate in FIG. 1, constituted, in order from the object, of a first lens group G1 having positive refractive power, a second lens group G2 having negative refractive power, a third lens group G3 having positive refractive power, and a fourth lens group G4 having positive refractive power.

The first lens group G1 is constituted, in order from the object, of a cemented lens of a negative meniscus lens L11 with a convex surface facing the object side and a biconvex shaped positive lens L12. An image side lens surface of the positive lens L12 is an aspherical surface.

The second lens group G2 is constituted, in order from the object, of a biconcave shaped negative lens L21, a biconcave shaped negative lens L22, and a positive meniscus lens L23 having a convex surface facing the object. An image side lens surface of the negative lens L21 is an aspherical surface.

The third lens group G3 is constituted, in order from the object, of a biconvex shaped positive lens L31, and a cemented lens of a positive meniscus lens L32 having a convex surface facing the object and a negative meniscus lens L33 with a convex surface facing the object side. Both surfaces of the positive lens L31 are aspherical surfaces.

The fourth lens group G4 is constituted of a positive meniscus lens L41 having a convex surface facing the object. An image side lens surface of the positive meniscus lens L41 is an aspherical surface.

In the present example, an aperture stop S aiming at adjusting an amount of light is disposed on the object side from the positive lens L31 located on the most object side of the third lens group G3.

A filter group FL is disposed between the fourth lens group G4 and the image surface I. The filter group FL is constituted of a low pass filter for cutting spatial frequencies equal to or higher than a limit resolution of a solid imaging element such an a CCD disposed at the image surface I and an infrared cut filter.

The zoom lens ZL1 according to the present example is so configured that, upon zooming from the wide-angle end state to the telephoto end state, each lens group is moved so that a distance between the first lens group G1 and the second lens group G2 is increased, a distance between the second lens group G2 and the third lens group G3 is decreased, and a distance between the third lens group G3 and the fourth lens group G4 is increased. During the zooming, the aperture stop S is integrally moved with the third lens group G3.

The zoom lens ZL1 according to the present example performs focusing from an infinite distance object to a finite distance object by moving the fourth lens group G4 along the optical axis.

In Table 1 below, each specification value in Example 1 is shown. Surface numbers 1 to 21 in Table 1 correspond to optical surfaces m1 to m21 shown in FIG. 1.

TABLE 1

| [Lens specifications] | | | | |
|---|---|---|---|---|
| Surface number | R | D | nd | νd |
| Object plane | ∞ | | | |
| 1 | 15.0662 | 0.5000 | 2.000690 | 25.46 |
| 2 | 11.5524 | 3.3000 | 1.618810 | 63.86 |
| 3* | −740.1283 | D3(variable) | | |

TABLE 1-continued

| | | | | |
|---|---|---|---|---|
| 4 | −796.5513 | 0.4000 | 1.851350 | 40.10 |
| 5* | 5.1061 | 2.2500 | | |
| 6 | −93.1916 | 0.4000 | 1.883000 | 40.66 |
| 7 | 10.5842 | 0.3000 | | |
| 8 | 8.3583 | 1.2500 | 1.945950 | 17.98 |
| 9 | 30.7068 | D9(variable) | | |
| 10(Stop S) | ∞ | 0.2500 | | |
| 11* | 4.8185 | 1.7000 | 1.593190 | 59.44 |
| 12* | −13.4332 | 0.2000 | | |
| 13 | 3.9892 | 1.1000 | 1.677900 | 67.90 |
| 14 | 11.0682 | 0.3000 | 2.000690 | 29.14 |
| 15 | 3.0638 | D15(variable) | | |
| 16 | 8.9287 | 1.7000 | 1.531530 | 55.95 |
| 17* | 28.7296 | D17(variable) | | |
| 18 | ∞ | 0.2100 | 1.516800 | 63.88 |
| 19 | ∞ | 0.3900 | | |
| 20 | ∞ | 0.5000 | 1.516800 | 63.88 |
| 21 | ∞ | 0.6000 | | |
| Image plane | ∞ | | | |

[Aspherical surface data]

| Surface number | κ | A4 | A6 | A8 | A10 |
|---|---|---|---|---|---|
| 3 | 1.0000 | 1.14795E−05 | −9.86591E−09 | 0.00000E+00 | 0.00000E+00 |
| 5 | 0.9657 | 0.00000E+00 | 1.73093E−05 | −2.56753E−07 | 7.39764E−09 |
| 11 | 0.0130 | 1.77585E−05 | 0.00000E+00 | 0.00000E+00 | 0.00000E+00 |
| 12 | 1.0000 | 4.07219E−04 | 0.00000E+00 | 0.00000E+00 | 0.00000E+00 |
| 17 | 1.0000 | 1.67439E−04 | 8.86060E−01 | 8.92770E−08 | 0.00000E+00 |

[Entire specifications]
Zoom ratio 11.29

| | Wide-angle end | Intermediate focal length | Telephoto end |
|---|---|---|---|
| f | 4.64 | 23.70 | 52.39 |
| FNo | 3.51 | 5.55 | 6.45 |
| ω | 42.96 | 9.58 | 4.29 |
| Y | 3.50 | 4.05 | 4.05 |
| Bf | 5.50957 | 12.49373 | 4.00470 |
| Bf(air-equivalent) | 5.26766 | 11.95182 | 3.76279 |
| TL | 34.9700 | 42.6037 | 49.6713 |

[Zooming data]

| Variable distance | Wide-angle end | Intermediate focal length | Telephoto end |
|---|---|---|---|
| f | 4.6402 | 23.6956 | 52.3902 |
| D3 | 0.3916 | 10.6000 | 15.9000 |
| D9 | 12.0396 | 2.0000 | 0.2959 |
| D15 | 3.3792 | 4.1600 | 15.8208 |
| D17 | 3.8096 | 10.4937 | 2.3047 |

[Zoom lens group data]

| Group number | Group first surface | Group focal length | Lens configuration length |
|---|---|---|---|
| G1 | 1 | 28.83812 | 3.80 |
| G2 | 4 | −5.63224 | 4.60 |
| G3 | 11 | 8.91180 | 3.30 |
| G4 | 16 | 23.66763 | 1.70 |

[Conditional expression]

Conditional expression (1) $TLt/(fw*ft)^{1/2}$ = 3.1857
Conditional expression (2) $-f2b/(fw*ft)^{1/2}$ = 0.6891
Conditional expression (3) f1/ft = 0.5504
Conditional expression (4) f1/(−f2) = 5.1202
Conditional expression (5) Nd = 2.001000
Conditional expression (6) (R42 + R41)/(R42 − R41) = 1.9019
Conditional expression (7) f3/f4 = 0.3765

From Table 1, it is understood that the zoom lens ZL1 according to the present example satisfies the conditional expressions (1) to (7).

FIG. 2 is a view illustrating various aberration diagrams (spherical aberration diagrams, astigmatism diagrams, distortion diagrams, coma aberration diagrams, and lateral chromatic aberration diagrams) of the zoom lens ZL1 according to Example 1, and (a), (b), and (c) represent various aberration diagrams upon focusing on infinity in the wide-angle end state, in the intermediate focal length state, and in the telephoto end state, respectively.

In each aberration diagram, FNO represents F number, A represents an half field angel (unit: °) for each image height, and d, g, C, and F represent aberration in d-line, g-line, C-line, and F-line, respectively. When no symbol is assigned, it represents aberration with respect to d-line. In an astigmatism diagram, a solid line represents a sagittal image surface and a broken line represents a meridional image surface. For aberration diagrams for each example described later, reference signs same as those in the present example are used.

As it is clear from each aberration diagram illustrated in FIG. 2, the zoom lens ZL1 according to Example 1 is excellently corrected for various aberrations in each focal length state from the wide-angle end state to the telephoto end state and has excellent optical performance.

Example 2

Example 2 is described by using FIG. 3, FIG. 4, and Table 2. A zoom lens ZL (ZL2) according to Example 2 is, as illustrated in FIG. 3, constituted, in order from the object, of a first lens group G1 having positive refractive power, a second lens group G2 having negative refractive power, a third lens group G3 having positive refractive power, and a fourth lens group G4 having positive refractive power.

The first lens group G1 is constituted, in order from the object, of a cemented lens of a negative meniscus lens L11 with a convex surface facing the object side and a biconvex shaped positive lens L12. An image side lens surface of the positive lens L12 is an aspherical surface.

The second lens group G2 is constituted, in order from the object, of a biconcave shaped negative lens L21, a biconcave shaped negative lens L22, and a positive meniscus lens L23 having a convex surface facing the object. Both surfaces of the negative lens L22 are aspherical surfaces.

The third lens group G3 is constituted, in order from the object, of a biconvex shaped positive lens L31, and a cemented lens of a positive meniscus lens L32 having a convex surface facing the object and a negative meniscus lens L33 with a convex surface facing the object side. Both surfaces of the positive lens L31 are aspherical surfaces.

The fourth lens group G4 is constituted of a positive meniscus lens L41 having a convex surface facing the object. An object side lens surface of the positive meniscus lens L41 is an aspherical surface.

In the present example, an aperture stop S aiming at adjusting an amount of light is disposed at a position further toward the object side than the positive lens L31 located on the most object side of the third lens group G3.

A filter group FL is disposed between the fourth lens group G4 and the image surface I. The filter group FL is constituted of a low pass filter for cutting spatial frequencies equal to or higher than a limit resolution of a solid imaging element such as an a CCD disposed at the image surface I and an infrared cut filter or the like.

The zoom lens ZL2 according to the present example is so configured that, upon zooming from the wide-angle end state to the telephoto end state, each lens group is moved so that a distance between the first lens group G1 and the second lens group G2 is increased, a distance between the second lens group G2 and the third lens group G3 is decreased, and a distance between the third lens group G3 and the fourth lens group G4 is increased. During the zooming, the aperture stop S is integrally moved with the third lens group G3.

The zoom lens ZL2 according to the present example performs focusing from an infinite distance object to a finite distance object by moving the fourth lens group G4 along the axis.

In Table 2 below, each specification value in Example 2 is shown. Surface numbers 1 to 21 in Table 2 correspond to optical surfaces m1 to m21 shown in FIG. 3.

TABLE 2

| [Lens specifications] | | | | |
|---|---|---|---|---|
| Surface number | R | D | nd | vd |
| Object plane | ∞ | | | |
| 1 | 15.8948 | 0.5000 | 1.846660 | 23.80 |
| 2 | 12.3720 | 3.3000 | 1.592520 | 67.86 |
| 3* | −243.0567 | D3(variable) | | |
| 4 | −74.5845 | 0.4000 | 1.883000 | 40.66 |
| 5 | 6.1762 | 1.9000 | | |
| 6* | −17.7965 | 0.6000 | 1.531100 | 55.91 |
| 7* | 8.4247 | 0.3000 | | |
| 8 | 7.7131 | 1.1500 | 1.945950 | 17.98 |
| 9 | 17.3242 | D9(variable) | | |
| 10(Stop S) | ∞ | 0.2500 | | |
| 11* | 5.3279 | 1.7000 | 1.589130 | 61.24 |
| 12* | −11.5395 | 0.2000 | | |
| 13 | 3.8789 | 1.1000 | 1.568830 | 56.00 |
| 14 | 16.5298 | 0.3000 | 2.001000 | 29.14 |
| 15 | 3.3083 | D15(variable) | | |
| 16* | 9.2913 | 1.7500 | 1.531100 | 55.91 |
| 17 | 67.0004 | D17(variable) | | |
| 18 | ∞ | 0.2100 | 1.516800 | 63.88 |
| 19 | ∞ | 0.3900 | | |
| 20 | ∞ | 0.5000 | 1.516800 | 63.88 |
| 21 | ∞ | 0.6000 | | |

TABLE 2-continued

| Image plane | ∞ |
|---|---|

[Aspherical surface data]

| Surface number | κ | A4 | A6 | A8 | A10 |
|---|---|---|---|---|---|
| 3 | 1.0000 | 1.38077E−05 | −1.27084E−08 | 0.00000E+00 | 0.00000E+00 |
| 6 | 1.0000 | −1.42340E−03 | 1.07169E−04 | −1.91048E−06 | 0.00000E+00 |
| 7 | 1.0000 | −1.09820E−03 | 1.41958E−04 | −2.83155E−06 | 0.00000E+00 |
| 11 | −0.7203 | 5.27733E−04 | 0.00000E+00 | 0.00000E+00 | 0.00000E+00 |
| 12 | 1.0000 | 4.55539E−04 | 0.00000E+00 | 0.00000E+00 | 0.00000E+00 |
| 16 | 1.0000 | −4.64422E−05 | 2.29199E−06 | 2.77043E−09 | 0.00000E+00 |

[Entire specifications]
Zoom ratio 11.29

| | Wide-angle end | Intermediate focal length | Telephoto end |
|---|---|---|---|
| f | 4.64 | 23.70 | 52.39 |
| FNo | 3.48 | 5.11 | 6.25 |
| ω | 42.26 | 9.74 | 4.36 |
| Y | 3.15 | 4.05 | 4.05 |
| Bf | 4.95580 | 11.34227 | 5.42880 |
| Bf(air-equivalent) | 4.71390 | 11.10036 | 5.18690 |
| TL | 35.1430 | 43.0875 | 50.7915 |

[Zooming data]

| Variable distance | Wide-angle end | Intermediate focal length | Telephoto end |
|---|---|---|---|
| f | 4.6350 | 23.7000 | 52.3863 |
| D3 | 0.4000 | 11.1982 | 15.6478 |
| D9 | 11.8494 | 2.0994 | 0.3004 |
| D15 | 4.4878 | 4.9976 | 15.9645 |
| D17 | 3.2558 | 9.6423 | 3.7288 |

[Zoom lens group data]

| Group number | Group first surface | Group focal length | Lens configuration length |
|---|---|---|---|
| G1 | 1 | 28.36324 | 3.80 |
| G2 | 4 | −5.41785 | 4.35 |
| G3 | 11 | 8.84779 | 3.30 |
| G4 | 16 | 20.09955 | 1.75 |

[Conditional expression]

Conditional expression (1) $TLt/(fw*ft)^{1/2}$ = 3.2595
Conditional expression (2) $-f2b/(fw*ft)^{1/2}$ = 0.6855
Conditional expression (3) f1/ft = 0.5414
Conditional expression (4) f1/(−f2) = 5.2351
Conditional expression (5) Nd = 2.001000
Conditional expression (6) (R42 + R41)/(R42 − R41) = 1.3220
Conditional expression (7) f3/f4 = 0.4402

From Table 2, it is understood that the zoom lens ZL2 according to the present example satisfies the conditional expressions (1) to (7).

FIG. 4 is a view illustrating various aberration diagrams (spherical aberration diagrams, astigmatism diagrams, distortion diagrams, coma aberration diagrams, and lateral chromatic aberration diagrams) of the zoom lens ZL2 according to Example 2, (a), (b), and (c) represent various aberration diagrams upon focusing on infinity in the wide-angle end state, in the intermediate focal length state, and in the telephoto state, respectively.

As it is clear from each aberration diagram illustrated in FIG. 4, the zoom lens ZL2 according to Example 2 is excellently corrected for various aberrations in each focal length state from the wide-angle end state to the telephoto end state and has excellent optical performance.

Example 3

Example 3 will be described by using FIG. 5, FIG. 6, and Table 3. A zoom lens ZL (ZL3) according to Example 3 is, as illustrate in FIG. 5, constituted, in order from the object, of a first lens group G1 having positive refractive power, a second lens group G2 having negative refractive power, a third lens group G3 having positive refractive power, and a fourth lens group G4 having positive refractive power.

The first lens group G1 is constituted, in order from the object, of a cemented lens of a negative meniscus lens L11 with a convex surface facing the object side and a biconvex shaped positive lens L12. An image side lens surface of the positive lens L12 is an aspherical surface.

The second lens group G2 is constituted, in order from the object, of a biconcave shaped negative lens L21, a biconcave shaped negative lens L22, and a positive meniscus lens L23 having a convex surface facing the object. Both surfaces of the negative lens L22 are aspherical surfaces.

The third lens group G3 is constituted, in order from the object, of a biconvex shaped positive lens L31, and a cemented lens of a positive meniscus lens L32 having a convex surface facing the object and a negative meniscus lens L33 with a convex surface facing the object side. Both surfaces of the positive lens L31 are aspherical surfaces.

The fourth lens group G4 is constituted of a positive meniscus lens L41 having a convex surface facing the object. An object side lens surface of the positive meniscus lens L41 is an aspherical surface.

In the present example, an aperture stop S aiming at adjusting an amount of light is disposed at a position further toward the object side than the positive lens L31 located on the most object side of the third lens group G3.

A filter group FL is disposed between the fourth lens group G4 and the image surface I. The filter group FL is constituted of a low pass filter for cutting spatial frequencies equal to or higher than a limit resolution of a solid imaging element such an a CCD disposed at the image surface I and an infrared cut filter or the like.

The zoom lens ZL3 according to the present example is so configured that, upon zooming from the wide-angle end state to the telephoto end state, each lens group is moved so that a distance between the first lens group G1 and the second lens group G2 is increased, a distance between the second lens group G2 and the third lens group G3 is decreased, and a distance between the third lens group G3 and the fourth lens group G4 is increased. During the zooming, the aperture stop S is integrally moved with the third lens group G3.

The zoom lens ZL3 according to the present example performs focusing from an infinite distance object to a finite distance object by moving the fourth lens group G4 along the optical axis.

In Table 3 below, each specification value in Example 3 is shown. Surface numbers 1 to 21 in Table 3 correspond to optical surfaces m1 to m21 shown in FIG. 5.

TABLE 3

| [Lens specifications] | | | | |
|---|---|---|---|---|
| Surface number | R | D | nd | νd |
| Object plane | ∞ | | | |
| 1 | 17.7326 | 0.5000 | 1.846660 | 23.78 |
| 2 | 13.3470 | 3.4000 | 1.592010 | 67.05 |
| 3* | −110.8383 | D3(variable) | | |
| 4 | −105.5549 | 0.4000 | 1.883000 | 40.80 |
| 5 | 6.1013 | 2.0000 | | |
| 6* | −20.8684 | 0.6000 | 1.531100 | 55.91 |
| 7* | 8.0283 | 0.2000 | | |
| 8 | 7.2498 | 1.2000 | 1.945950 | 17.98 |
| 9 | 15.6043 | D9(variable) | | |
| 10(Stop S) | ∞ | −0.2500 | | |
| 11* | 4.6510 | 1.7000 | 1.583320 | 59.28 |
| 12* | −10.1220 | 0.1000 | | |
| 13 | 5.6957 | 1.2000 | 1.593190 | 67.90 |
| 14 | 9.5626 | 0.3000 | 2.000690 | 25.46 |
| 15 | 3.4990 | D15(variable) | | |
| 16* | 9.1074 | 1.7000 | 1.531100 | 55.91 |
| 17 | 37.4766 | D17(variable) | | |
| 18 | ∞ | 0.2100 | 1.516800 | 63.88 |
| 19 | ∞ | 0.2800 | | |
| 20 | ∞ | 0.5000 | 1.516800 | 63.88 |
| 21 | ∞ | 0.6000 | | |
| Image plane | ∞ | | | |

| [Aspherical surface data] | | | | | |
|---|---|---|---|---|---|
| Surface number | κ | A4 | A6 | A8 | A10 |
| 3 | 1.0000 | 1.29175E−05 | −1.59138E−08 | 0.00000E+00 | 0.00000E+00 |
| 6 | 1.0000 | −2.68748E−03 | 2.39176E−04 | −6.12069E−06 | 0.00000E+00 |
| 7 | −9.1589 | 0.00000E−03 | 1.94240E−04 | −4.99263E−06 | 0.00000E+00 |
| 11 | −0.8139 | 4.77568E−04 | 0.00000E+00 | 0.00000E+00 | 0.00000E+00 |
| 12 | 1.0000 | 5.18766E−04 | 0.00000E+00 | 0.00000E+00 | 0.00000E+00 |
| 16 | 1.0000 | 7.19064E−05 | 9.84249E−07 | 7.85238E−09 | 0.00000E+00 |

| [Entire specifications] Zoom ratio 11.34 | | | |
|---|---|---|---|
| | Wide-angle end | Intermediate focal length | Telephoto end |
| f | 4.62 | 26.00 | 52.40 |
| FNo | 3.42 | 5.55 | 6.54 |
| ω | 42.25 | 8.94 | 4.31 |
| Y | 3.25 | 4.00 | 4.05 |
| Bf | 4.40403 | 8.19505 | 4.13603 |
| Bf(air-equivalent) | 4.16212 | 7.95314 | 3.89413 |
| TL | 35.1430 | 43.0875 | 50.7915 |

TABLE 3-continued

[Zooming data]

| Variable distance | Wide-angle end | Intermediate focal length | Telephoto end |
|---|---|---|---|
| f | 4.6161 | 23.0029 | 52.3960 |
| D3 | 0.3966 | 12.2757 | 16.2054 |
| D9 | 12.1178 | 2.8792 | 0.8025 |
| D15 | 4.6870 | 10.2931 | 16.6618 |
| D17 | 2.8880 | 6.6773 | 2.5943 |

[Zoom lens group data]

| Group number | Group first surface | Group focal length | Lens configuration length |
|---|---|---|---|
| G1 | 1 | 29.53701 | 3.90 |
| G2 | 4 | −5.52404 | 4.40 |
| G3 | 11 | 8.47073 | 3.30 |
| G4 | 16 | 22.19207 | 1.70 |

[Conditional expression]

Conditional expression (1) $TLt/(fw*ft)^{1/2}$ = 3.2700
Conditional expression (2) $-f2b/(fw*ft)^{1/2}$ = 0.6969
Conditional expression (3) f1/ft = 0.5637
Conditional expression (4) f1/(−f2) = 5.3470
Conditional expression (5) Nd = 2.000690
Conditional expression (6) (R42 + R41)/(R42 − R41) = 1.6421
Conditional expression (7) f3/f4 = 0.3817

From Table 3, it is understood that the zoom lens ZL3 according to the present example satisfies the conditional expressions (1) to (7).

FIG. 6 is a view illustrating various aberration diagrams (spherical aberration diagrams, astigmatism diagrams, distortion diagrams, coma aberration diagrams, and lateral chromatic aberration diagrams) of the zoom lens ZL3 according to Example 3, (a), (b), and (c) represent various aberration diagrams upon focusing on infinity in the wide-angle end state, in the intermediate focal length state, and in the telephoto state, respectively.

As it is clear from each aberration diagram illustrated in FIG. 6, the zoom lens ZL3 according to Example 3 is excellently corrected for various aberrations in each focal length state from the wide-angle end state to the telephoto end state and has excellent optical performance.

According to the present embodiment, a compact zoom lens having excellent optical performance while having a high zoom ratio may be achieved.

For easier understanding of the present invention, descriptions are made with structural features of the embodiments, but needless to say, the present invention is not limited to these.

Although, in the above described embodiments, four-group configurations are shown, the present invention is applicable to other group configurations such as five-group and six-group configurations. Also, the present invention may include a configuration in which a lens or a lens group is added on the most object side or a configuration in which a lens or a lens group is added on the most image side. Here, a lens group means a part having at least one lens separated by an air interval to be changed during zooming.

For instance, a lens group may be a single or a plurality of lens groups or a focusing lens group for focusing from an infinite distance object to a finite distance object by moving a partial lens group along the optical axis. Such a focusing lens group may be applied to autofocusing, and is also suitable for a motor drive for autofocusing (by using an ultrasonic motor and such). Although, in each example described above, the total fourth lens group G4 is made to be a focusing lens group, a partial group of the fourth lens group G4 may be made to be a focusing lens group.

A lens group may be a vibration proof lens group for correcting image blurring generated by camera shake by moving a lens group or a partial lens group so as to have a component in a direction perpendicular to the optical axis or by rotating and moving (swinging) in an in-plane direction containing the optical axis. Although, in each embodiment described above, the total third lens group G3 is made to be a vibration proof lens group, a partial group of the third lens group G3 may be made to be a vibration proof lens group.

A lens surface may be formed either of a spherical surface, a flat surface, or an aspherical surface. Preferably a lens surface is a spherical surface or a flat surface as it makes it easier to implement lens processing, assemblies and adjustment, hence degradation of optical performance caused by errors from processing, assemblies, and adjustments is prevented. Moreover, even when the image surface is deviated, degradation of optical performance can be small. When a lens surface is an aspherical surface, the aspherical surface may be any one of an aspherical surface formed by grinding processing, a glass mold aspherical surface formed by shaping glass into an aspherical surface shape with a mold, or a complex type aspherical surface formed by forming a resin into an aspherical surface shape on a surface of glass. A lens surface may be a diffractive surface. A lens may be a refractive index distribution type lens (GRIN lens) or a plastic lens.

Although an aperture stop is preferably disposed near the third lens group, a frame of a lens may substitute its role without providing a member as an aperture stop.

Each lens surface may be applied with an antireflection film having high transmittance for a wide wavelength range for reducing flare and ghost, and achieving high optical performance with high contrast.

EXPLANATION OF NUMERALS AND CHARACTERS

ZL (ZL1 to ZL3) Zoom lens
G1 First lens group
G2 Second lens group
G3 Third lens group
G4 Fourth lens group
S Aperture stop
FL Filter group
I Image surface
CAM Digital still camera (optical device)

The invention claimed is:

1. A zoom lens comprising, in order from an object: a first lens group having positive refractive power; a second lens group having negative refractive power; a third lens group having positive refractive power; and a fourth lens group having positive refractive power, wherein
upon zooming from a wide-angle end state to a telephoto end state, all of the first to fourth lens groups are moved, distances between respective lens groups change, and the fourth lens group moves initially to the object side and thereafter to an image side,
the second lens group consists of, in order from the object: a first negative lens, a second negative lens, and a positive lens,
the third lens group includes, in order from the object: a positive lens, a positive lens, and a negative lens, and
the following conditional expressions are satisfied:

$2.50 < TLt/(fw*ft)^{1/2} < 3.30$ $2.00 < Nd < 2.50$ $0.40 < f1/ft < 0.70$, where
TLt represents a total length of the zoom lens in the telephoto end state,
fw represents a focal length of the zoom lens in the wide-angle end state,
ft represents a focal length of the zoom lens in the telephoto end state,
Nd represents a refractive index with respect to d-line of the negative lens of the third lens group, and
f1 represents a focal length of the first lens group.

2. The zoom lens according to claim 1, wherein the following conditional expression is satisfied:

$0.50 < -f2b/(fw*ft)^{1/2} < 0.90$, where
f2b represents a focal length of the second negative lens of the second lens group.

3. The zoom lens according to claim 1, wherein the following conditional expression is satisfied:

$4.8 < f1/(-f2) < 5.6$, where
f1 represents a focal length of the first lens group, and
f2 represents a focal length of the second lens group.

4. The zoom lens according to claim 1, wherein at least one surface of one of the first and second negative lenses of the second lens group is an aspherical surface.

5. The zoom lens according to claim 1, wherein the fourth lens group includes a positive lens and the following conditional expression is satisfied:

$0.5 < (R42+R41)/(R42-R41) < 2.0$, where
R41 represents a paraxial radius of curvature of an object side lens surface of the positive lens of the fourth lens group, and
R42 represents a paraxial radius of curvature of an image side lens surface of the positive lens of the fourth lens group.

6. The zoom lens according to claim 1, wherein the following conditional expression is satisfied:

$0.20 < f3/f4 < 0.60$, where
f3 represents a focal length of the third lens group, and
f4 represents a focal length of the fourth lens group.

7. An optical device including the zoom lens according to claim 1.

8. A method for manufacturing a zoom lens, comprising:
disposing in a lens barrel, in order from an object, a first lens group having positive refractive power, a second lens group having negative refractive power, a third lens group having positive refractive power, and a fourth lens group having positive refractive power, wherein
the first to fourth lens groups are disposed such that, upon zooming from a wide-angle end state to a telephoto end state, all of the first to fourth lens groups are moved, distances between respective lens groups are changed, and the fourth lens group moves initially to the object side and thereafter to an image side,
the second lens group consists of, in order from the object: a first negative lens, a second negative lens, and a positive lens,
the third lens group includes, in order from the object, a positive lens, a positive lens, and a negative lens, and
the following conditional expressions are satisfied:

$2.50 < TLt/(fw*ft)^{1/2} < 3.30$ $2.00 < Nd < 2.50$ $0.40 < f1/ft < 0.70$, where
TLt represents a total length of the zoom lens in the telephoto end state,
fw represents a focal length of the zoom lens in the wide-angle end state,
ft represents a focal length of the zoom lens in the telephoto end state,
Nd represents a refractive index with respect to d-line of the negative lens of the third lens group, and
f1 represents a focal length of the first lens group.

* * * * *